(12) United States Patent
Hebert et al.

(10) Patent No.: US 11,546,378 B2
(45) Date of Patent: Jan. 3, 2023

(54) SMART EXPOSURE OF DATA TO KNOWN ATTACKER SESSIONS

(71) Applicant: SAP SE, Walldorf (DE)

(72) Inventors: Cedric Hebert, Mougins (FR); Manuel Karl, Karlsruhe (DE)

(73) Assignee: SAP SE, Walldorf (DE)

( * ) Notice: Subject to any disclaimer, the term of this patent is extended or adjusted under 35 U.S.C. 154(b) by 642 days.

(21) Appl. No.: 16/552,959

(22) Filed: Aug. 27, 2019

(65) Prior Publication Data

US 2021/0067552 A1 Mar. 4, 2021

(51) Int. Cl.
*H04L 29/06* (2006.01)
*H04L 9/40* (2022.01)

(52) U.S. Cl.
CPC ...... *H04L 63/1491* (2013.01); *H04L 63/1416* (2013.01); *H04L 63/1466* (2013.01)

(58) Field of Classification Search
CPC ............. H04L 63/1491; H04L 63/1416; H04L 63/1466
See application file for complete search history.

(56) References Cited

U.S. PATENT DOCUMENTS

| | | | | |
|---|---|---|---|---|
| 8,874,528 B1* | 10/2014 | Banerjee | ............... | G06F 16/217 707/694 |
| 8,955,143 B1* | 2/2015 | Ramalingam | ......... | G06F 16/951 713/161 |
| 10,425,437 B1* | 9/2019 | Bog | .................... | H04L 63/1425 |
| 10,521,584 B1* | 12/2019 | Sharifi Mehr | ...... | H04L 63/1433 |
| 2008/0256172 A1 | 10/2008 | Hebert et al. | | |
| 2009/0077376 A1 | 3/2009 | Montagut et al. | | |
| 2009/0222399 A1 | 9/2009 | Gomez et al. | | |
| 2009/0327317 A1 | 12/2009 | Ulmer et al. | | |
| 2011/0276597 A1* | 11/2011 | Little | .................. | H04L 63/1416 709/227 |
| 2012/0042364 A1 | 2/2012 | Hebert | | |
| 2013/0160079 A1 | 6/2013 | Hebert | | |
| 2013/0262397 A1 | 10/2013 | Hebert | | |
| 2014/0372927 A1 | 12/2014 | Hebert et al. | | |
| 2015/0033346 A1 | 1/2015 | Hebert et al. | | |
| 2016/0078234 A1 | 3/2016 | Li et al. | | |

(Continued)

OTHER PUBLICATIONS

Sanchez-Rola et al., "Clock Around the Clock: Time-Based Device Fingerprinting", Oct. 2018, ACM SIGSAC Conference, 13 pgs.

(Continued)

*Primary Examiner* — Joseph P Hirl
*Assistant Examiner* — Thomas A Gyorfi
(74) *Attorney, Agent, or Firm* — Klarquist Sparkman, LLP

(57) ABSTRACT

Systems, methods, and computer media for securing software applications are provided herein. By recording path data representing interactions between an application and other components, it can be determined what data an attacker has received by the time malicious activity is detected. During a session with an application, queries made to a dataset by the application can be recorded. After the session is found to be malicious, the session is transferred to a cloned application session in which access to the dataset is blocked. Based on the recorded queries, an alternative dataset for queries made in the cloned application session is generated that includes a subset of the original dataset, thus limiting future queries of the attacker in the cloned application session to data already received before the malicious activity was detected.

17 Claims, 7 Drawing Sheets

(56) References Cited

U.S. PATENT DOCUMENTS

| | | | |
|---|---|---|---|
| 2016/0099953 | A1 | 4/2016 | Hebert et al. |
| 2016/0112376 | A1 | 4/2016 | Gomez et al. |
| 2017/0019421 | A1 | 1/2017 | Hebert et al. |
| 2017/0169217 | A1 | 6/2017 | Rahaman et al. |
| 2017/0177308 | A1 | 6/2017 | Montagnon et al. |
| 2017/0177310 | A1 | 6/2017 | Mathias et al. |
| 2018/0004978 | A1 | 1/2018 | Hebert et al. |
| 2018/0041546 | A1 | 2/2018 | Gomez et al. |
| 2018/0077174 | A1 | 3/2018 | Hebert |
| 2019/0068641 | A1* | 2/2019 | Araujo ............... G06F 21/566 |
| 2020/0267173 | A1* | 8/2020 | Ghosh .................. G06F 21/53 |
| 2020/0344247 | A1* | 10/2020 | Fleming ............. G06F 11/2056 |

OTHER PUBLICATIONS

"Observations From the Front Lines of Threat Hunting: A 2018 Mid-Year Review From Falcon OverWatch", https://go.crowdstrike.com/rs/281-OBQ-266/images/Report20180verwatchReport.pdf, 20 pgs.

"The RASP market size is expected to grow from USD 294.7 million in 2017 to USD 1, 240.1 million by 2022, at a Compound Annual Growth Rate (CAGR) of 33.3%", https://www.prnewswire.com/news-releases/the-rasp-market-size-is-expected-to-grow-from-usd-2947-million-in-2017-to-usd-12401-million-by-2022-at-a-compound-annual-growth-rate-cagr-of-333-300578893.html, Jan. 8, 2018, 4 pgs.

Canarytokens by Thinkst, https://canarytokens.org/generate, accessed Aug. 13, 2019, 1 pg.

AppSensor DetectionPoints, https://www.owasp.org/index.php/AppSensor_DetectionPoints, accessed Aug. 13, 19, 38 pgs.

\* cited by examiner

SMART EXPOSURE OF DATA TO KNOWN ATTACKER SESSIONS

BACKGROUND

As reliance on the Internet and software applications has continued to grow, cyber security has also gained in importance. Securing computer systems and applications against attackers employing varying malicious techniques has become a difficult task. In addition to exploiting software bugs and vulnerabilities, some attackers obtain valid credentials for authorized users and use these credentials to gain unauthorized access to applications or computer systems. Detecting and managing such unauthorized access is challenging.

DETAILED DESCRIPTION

The examples described herein generally secure software applications against unauthorized access. By recording path data representing interactions between an application and other components such as a user's web browser, an application programming interface (API), and a data store, the described examples allow determination of which data the user has already received at the time malicious activity is detected. Once malicious activity is detected, the user can be transferred to a cloned application session that resembles the application session but in which the user is blocked from further accessing the data store to prevent more exposure of data than has already occurred. If the user has already interacted with the application and viewed some data, the user would likely realize she has been detected if that data is not still accessible in the cloned application session. The described examples allow such compromised data to be identified and made accessible to the cloned application session without making additional data available, thus securing the application and the remaining data without tipping off an attacker that she has been discovered.

In a web application example, a user interacts with an application through a browser and the application queries data through an API. The API queries a database and provides results to the application, and the application provides information to the browser. In this example, it can be difficult to determine what data was actually provided to the browser. Many times, more data was accessed and returned by the API than is ultimately provided to the browser. For example, an application may omit certain fields or other aspects from data returned by the API before providing the data to the browser. As another example, the application can perform certain operations, such as averaging or otherwise combining multiple data records before providing information to the browser.

By recording path data during an application session, the data actually provided to a user via the browser can be determined and the amount of real data needed to be made available in a cloned application session can be minimized. Example path data in a web application example includes HyperText Transfer Protocol (HTTP) requests from the browser, Structured Query Language (SQL) commands generated by the API, JavaScript Object Notation (JSON) files returned from the API to the application, and/or information sent to the web browser by the application. The path data can be used to generate a query that, when executed, returns the compromised data.

The described approaches to securing an application by recording path data keep data and applications secure from malicious activity and keep attackers from discovering that they have been identified by maintaining only data the attacker has already seen in the cloned application session. Examples are described below with reference to FIGS. 1-7.

Figure 1:
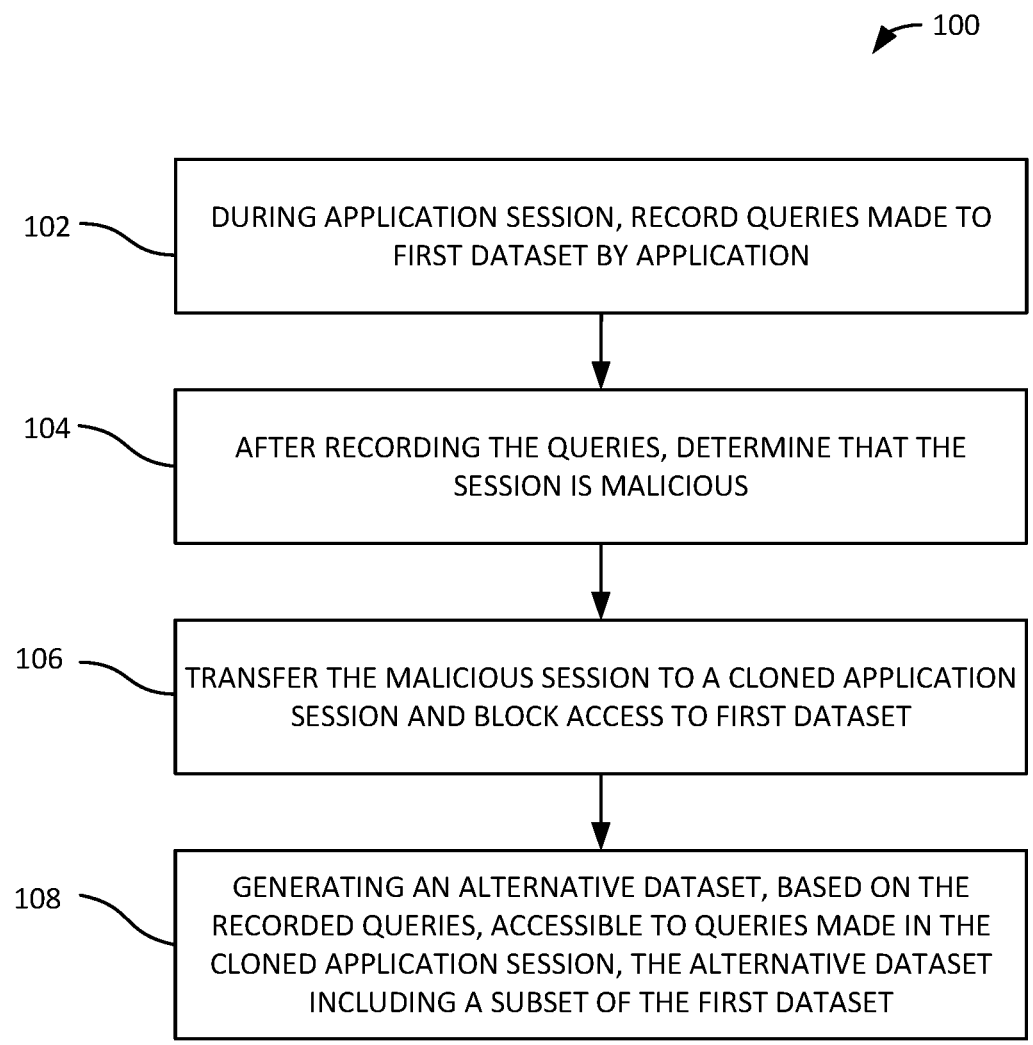
FIG. 1 illustrates an example method of securing an application through smart exposure of data.

FIG. 1 illustrates an example method 100 of securing an application through smart exposure of data. In process block 102, during a session with an application, one or more queries made to a first dataset by the application are recorded. The queries made by the application are an example of path data, which represents interactions among the application and other components such as a user's browser, an API, and a database or other data store. The queries can, for example, be made by the application to an API to request data that corresponds to a user action. For example, if a user navigates to his profile page while interacting with the application through a browser window, the application sends a query to the API requesting profile data that corresponds to the user, and the API issues a command to retrieve the desired data from the first dataset. The application can also query the first dataset directly. The dataset can be stored in a database or other data structure.

Other examples of path data include commands made by an API in response to queries made by the application, information representing a response sent by the API to the application, and information sent to the web browser by the application. Information sent to the web browser by the application and/or information representing a response sent by the API to the application can include a data type (e.g., a data field such as "name" or "city"). Path data can be recorded from the beginning of each session, and recording can end once a session is determined to be malicious.

In process block 104, after the one or more queries are recorded, it is determined that the session is a malicious session. During an application session, activity can indicate that the session is likely to be malicious even when valid account credentials have been provided (e.g., an attacker logs in with stolen credentials). Such indicators are also known as "honeytokens," "deceptive elements," "bread crumbs," "canaries," or "canary tokens." Honeytokens can be files, folders, URLs, options, usernames/passwords (e.g., admin/admin) or other items. A honeytoken might be triggered, for example, when a user attempts to access an admin URL, look for a hidden function, modify a session cookie to become an administrator, or take other actions that are unusual for a typical user.

The malicious session is transferred to a cloned application session in process block 106. In the cloned application session, access to the first dataset is blocked. In process block 108, an alternative dataset is generated and used in place of the first dataset. The alternative dataset is accessible to queries made in the cloned application session and includes a subset of the first dataset. The alternative dataset is based on the one or more recorded queries made by the application. The subset of the first dataset included in the alternative dataset can be data determined to have been returned to the application as a result of the one or more queries and/or data determined to have been provided to a client computing device interacting with the application prior to determining that the session is malicious. Data in the first dataset that was not queried by the application prior to the transferring to the cloned application session is not included in the alternative dataset. Data in the subset of the first dataset can be selected based on refinement of the one or more recorded queries, and the refined query can be executed against the first dataset to identify the subset.

In some examples, the alternative dataset is a same size as the first dataset or at least as large as the first dataset. In such examples, new data can be generated and combined with the subset of data from the first dataset to form the alternative dataset. New data is "fake" data generated for the purposes of filling out the alternative dataset around the "real" data in the subset of data from the first dataset. Thus, if the queries made by the application resulted in data records 2, 3, and 25 out of 30 total records being provided to an attacker's browser and thus being compromised, the alternative dataset can be generated to include the real data records for 2, 3, and 25 along with fake data generated to bring the alternative dataset up to 30 total records. If attacker activity causes a query to return data records 2, 5, and 6 while in the cloned application session, data returned for record 2 will be real data, and data returned for records 5 and 6 will be fake data.

In this way, the attacker will still see expected results corresponding to data records 2, 3, and 25 but will not realize that further interactions that cause the cloned application to query for other data records, such records 18, 19, and 20, will cause fake data to be returned to the attacker instead of the data found in the first dataset. If an attacker is aware he is caught, the attacker may try different techniques with other stolen credentials. In the described examples, because the attacker is unaware he has been discovered, the attacker can be monitored while at the same time being prevented from accessing additional data.

In some examples, the subset of data is stored in the alternative dataset with the same key or other identifier as is used in the first dataset. In some cases, to prevent the real identifiers from being leaked or hacked in a future incursion, the data items in the subset of data are assigned new identifiers, and a mapping file is used to indicate which new identifiers correspond to the original identifiers. When future queries are received, the mapping file can be accessed and the new identifier can be substituted for the original identifier to ensure the correct data is retrieved.

Rather than making the alternative dataset as large as the first dataset, in some examples, the alternative dataset only contains the subset of data. In one such example, when a new query is made during the cloned application session that overlaps with the one or more queries recorded prior to determining that the session is malicious, query results for the overlapping portion of the new query are provided from the alternative dataset, and query results for the non-overlapping portion of the new query are automatically generated results that are not included in the first dataset. Through this approach, the overall amount of data storage is reduced by eliminating the need to have an alternative dataset as large as the first dataset. In some examples, machine learning is used to determine the characteristics of data that should be automatically generated. The subset of data, which has been compromised, can be used as training data for a machine learning algorithm.

Figure 2:
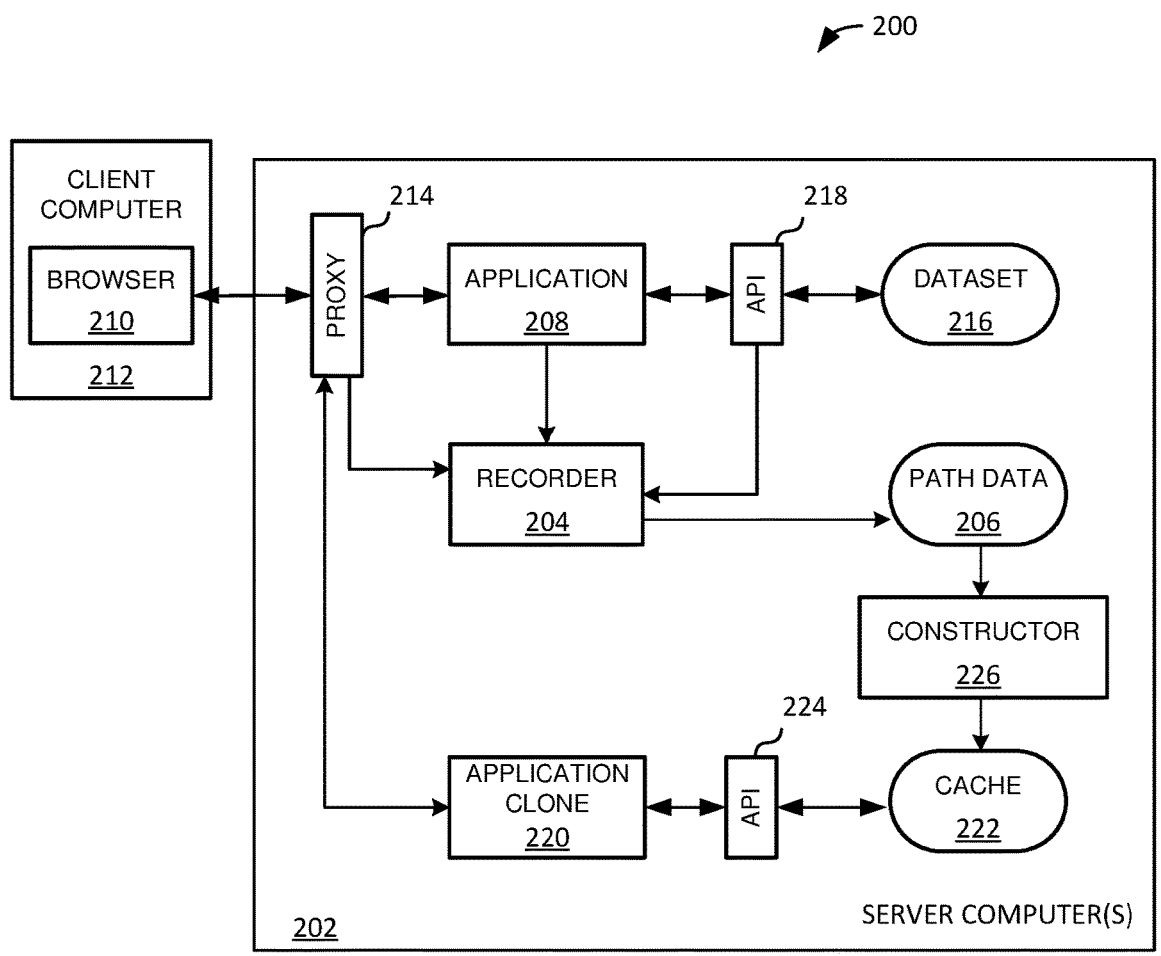
FIG. 2 is an example application security system that records path data to determine what data has been provided to an attacker during a malicious session.

FIG. 2 illustrates an example application security system 200 implemented on one or more server computers 202. System 200 can be used to implement, for example, method 100 of FIG. 1. Recorder 204 is configured to record path data 206 during a session with an application 208 in which a web browser 210 running on a client computer 212 interacts with application 208 via proxy 214 and application 208 accesses a dataset 216. Proxy 214 can be a separate proxy server or proxy functionality implemented on server computer(s) 202.

Path data 206 represents interactions among web browser 210, application 208, dataset 216, and API 218. Path data 206 can be provided to recorder 204 as information is transmitted between proxy 214, application 208, and API 218. Path data 206 can include one or more queries made by application 208. Path data 206 can also include: one or more commands made by API 218 in response to the one or more queries made by application 208; information representing a response sent by API 218 to application 208; or information sent to web browser 210 by application 208. As specific examples, path data can include HyperText Transfer Protocol (HTTP) requests from browser 210, Structured Query Language (SQL) commands generated by API 218, or JavaScript Object Notation (JSON) files returned from API 218 to application 208.

Proxy 214, application 208, and/or recorder 204 can be configured to detect malicious activity in application sessions. As discussed with respect to FIG. 1, sessions can be malicious even when valid credentials are used to establish the session. When a honeytoken is triggered, the session is characterized as malicious. Once the session has been indicated as malicious, access to dataset 216 is denied. Based on the path data 206, a compromised portion of dataset 216 is determined. The compromised portion can be the portion provided to web browser 210 prior to detection of the malicious activity. After the session has been characterized as malicious, the session is transferred (e.g., by proxy 214) to a cloned application session with application clone 220. Application clone 220 can query an alternative dataset, shown as cache 222, instead of dataset 216. Cache 222 contains the compromised portion of dataset 216 but not other data in dataset 216.

As discussed above with respect to FIG. 1, in some examples, cache 222 also includes new data such that the compromised data and the new data are at least as many data items as are in dataset 216. This can be done, for example, by populating a first part of cache 222 with the data in the compromised portion of dataset 216 and populating a second part of cache 222 with new (fake) data not associated with dataset 216. Thus, queries sent from application clone 220 via an API 224 to cache 222 can return either or both compromised, real data or fake data, depending on the query.

In some examples, the alternative dataset (e.g., cache 222) is a same size or at least as large as dataset 216. The alternate dataset can first be populated with new data to the same number of records as dataset 216, and data in the compromised portion of dataset 216 can be written over some of the new data based on identifiers associated with the data in the compromised portion of dataset 216. For example, if there are 30 records, 30 fake data items are generated. If the compromised data is data records 2, 3, and 8, the fake data in records 2, 3, and 8 are overwritten with the compromised data. Alternatively, to avoid including the compromised data's real identifiers in the alternative dataset, data records 2, 3, 8 can be overwritten in other positions (e.g., 7, 17, and 20) and a mapping file can be created between 2, 3, and 8 and 7, 17, and 20.

The alternative dataset (e.g., cache 222) can also store less data than dataset 216. In some examples, the alternative dataset includes compromised data, but instead of filling out the alternative dataset with fake data, data is automatically generated when queries identify data that is not compromised data. Thus, for query results that are found in the compromised portion of dataset 216, compromised data is returned, and for query results that are not found in the compromised portion of dataset 216, replacement data is generated and returned.

Constructor 226 constructs a refined query based on path data 206. The refined query reflects the compromised portion of dataset 216, and constructor 226 executes the refined query against dataset 216 to populate cache 222. In some examples, constructor 226 periodically constructs the refined query based on the path data 206 and executes the refined query so that cache 222 stays up to date.

Figure 3:
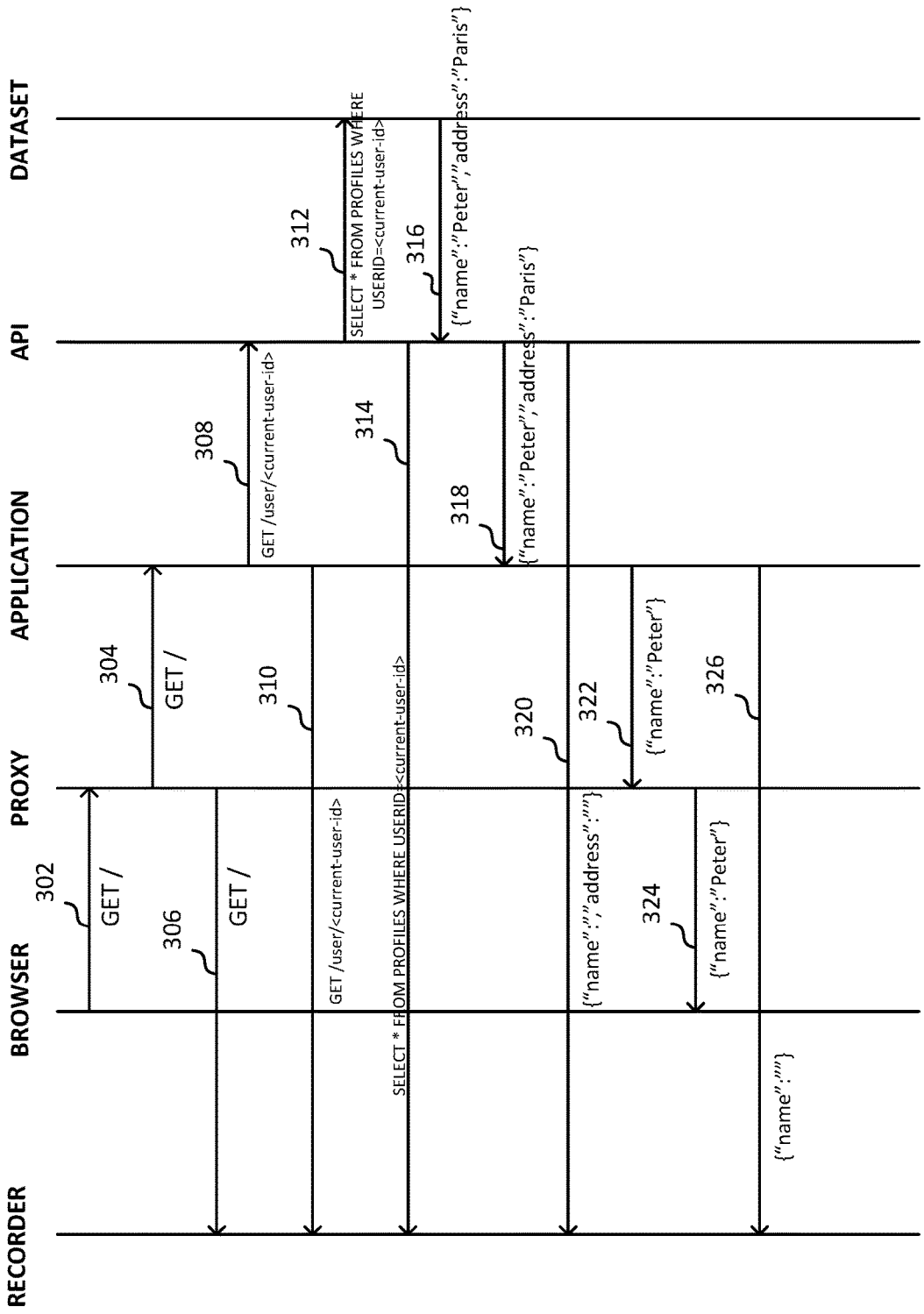
FIG. 3 illustrates example path data for the system of FIG. 2.

FIG. 3 illustrates a path data flow diagram 300 illustrating an example path data flow for the system shown in FIG. 2. The recorder, browser, proxy, application, API, and dataset shown in FIG. 3 represent the corresponding components in FIG. 2. Flow diagram 300 begins with a request at the browser to see a user named Peter's profile in the application. At flow element 302, a "GET/" command is sent to the proxy. The proxy forwards the command to the application in flow element 304. At flow element 306, the proxy also sends a copy of the command to the recorder. At flow element 308, the application executes its logic and sends a request for the user name to the API—"GET/user/<current-user-id>." The application sends a copy of this request to the recorder at flow element 310.

The API converts the request from the application into a SQL command such as "SELECT * FROM PROFILES WHERE USERID=<current-user-id>" and queries the dataset at flow element 312. The API also provides a copy of the SQL command to the recorder at flow element 314. At flow element 316, the API identifies data in the dataset—"{"name":"Peter","address":"Paris"}." This response is returned to the application at flow element 318. At flow element 320, the format of the response, without content—"{"name":"","address":""}"—is sent to the recorder. At flow element 322, the application retrieves the name from the response and sends it to the proxy as a JSON fragment—"{"name":"Peter"}." The JSON fragment is then forwarded by the proxy at flow element 324 to the browser, and the browser will render "Hello, Peter" on the profile page. At flow element 326, the application (or the proxy) forward the format of the JSON fragment—"{"name":""}"- to the recorder without the content.

The data received by the recorder (e.g., recorder 204 of FIG. 2) is saved in the path data (e.g., path data 206 of FIG. 2). In some examples, additional system components are included and thus additional data is provided to the recorder. In some examples, not all of the data shown as provided to the recorder in FIG. 3 is provided (e.g., some of flow elements 306, 310, 314, 320, and 326 are omitted). In some examples, a software element in each of the browser, the proxy, the application, and the API instructs the corresponding component to also send a copy to the recorder. In some examples, in the flow elements where only the format is forwarded to the recorder, both the format and content are forwarded, and the recorder or constructor (e.g., constructor 226 of FIG. 2) ignores or removes the content.

By recording the format of returned results, it can be determined, for example, that although "address" was returned as a result of the "SELECT *" SQL command, the application only wanted "name," and this was the only data ultimately provided to the browser. The constructor (or in some examples, the recorder) can analyze received path data and simplify or otherwise refine one or more queries made by the application. In some examples, an initial query is refined by the constructor as path data is received. In an example where the ID of the current user is "15" in path flow diagram 300, the initial SQL command executed by the API would be "SELECT * FROM PROFILES WHERE USERID=15." Thus, everything is being selected from the table "PROFILES" where the user ID is 15.

When the recorder receives the format of the JSON object,—{"name":"","address":""}"—at flow element 320 it knows that the only things being returned are name and address, so the SQL command can be refined to "SELECT name, address FROM PROFILES WHERE USERID=15." Similarly, when the recorder receives the JSON fragment "{"name":""}" in flow element 326, the recorder can further simplify the SQL query to "SELECT name FROM PROFILES WHERE USERID=15." This refined query provides all of the information that has been communicated to the browser. In examples in which database or dataset fields do not match JSON fields, a mapping file can be introduced to translate the JSON fields to allow the SQL command to be refined. In some examples, only a current query is stored in the path data, and the current query is updated each time path data is received by the recorder. In other example, each piece of path data is stored and then analyzed by the recorder or constructor.

In another example, a "PRODUCTS" table is queried by the API using "SELECT *", then refined to "SELECT price" and then path data is received indicating an average has been calculated. The SQL command can be further updated to "SELECT AVG(price)." In such a situation, the browser was only provided the average, not the individual data items. New data items can then be generated such that the average of those data items is the correct average the attacker has seen, and those new data items can be stored in the alternative dataset (e.g., cache 222).

Figure 4:
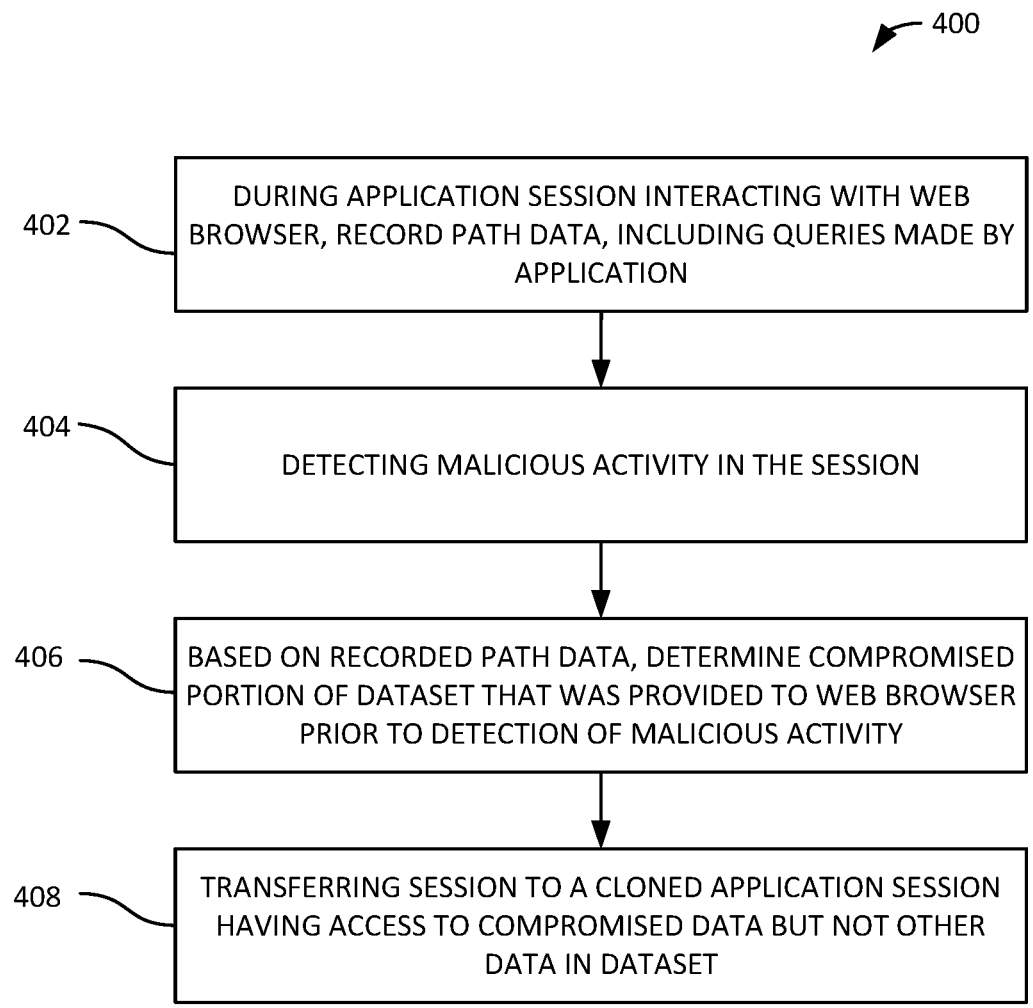
FIG. 4 illustrates an example method that can be performed using the system of FIG. 2.

FIG. 4 illustrates a method 400 that can be used to implement system 200 of FIG. 2. In process block 402, during a session with an application in which a web browser interacts with the application and the application accesses a dataset, path data is recorded for the session. The path data represents interactions among the web browser, application, and data store. The path data includes one or more queries made by the application. In process block 404, malicious activity is detected in the session (e.g., a honeytoken is triggered). Based on the recorded path data, a compromised portion of the dataset is determined in process block 406. The compromised portion of the dataset was provided to the web browser prior to detection of the malicious activity. In process block 408, the session is transferred to a cloned application session. The cloned application session has access to the compromised portion of the dataset but not to other data in the dataset.

Constructing compromised data (e.g., done by constructor 226 to generate data for cache 222) can be done in a number of ways. For example, the alternative dataset can be filled with fake data and "SELECT" statements can be converted into "UPDATE" statements to overwrite some of the fake data. In some examples in which the alternative dataset is not filled with fake data but fake data is generated on demand to provide results for cloned application session queries, "INSERT" statements can be used to populate the alternative dataset.

Figure 5:
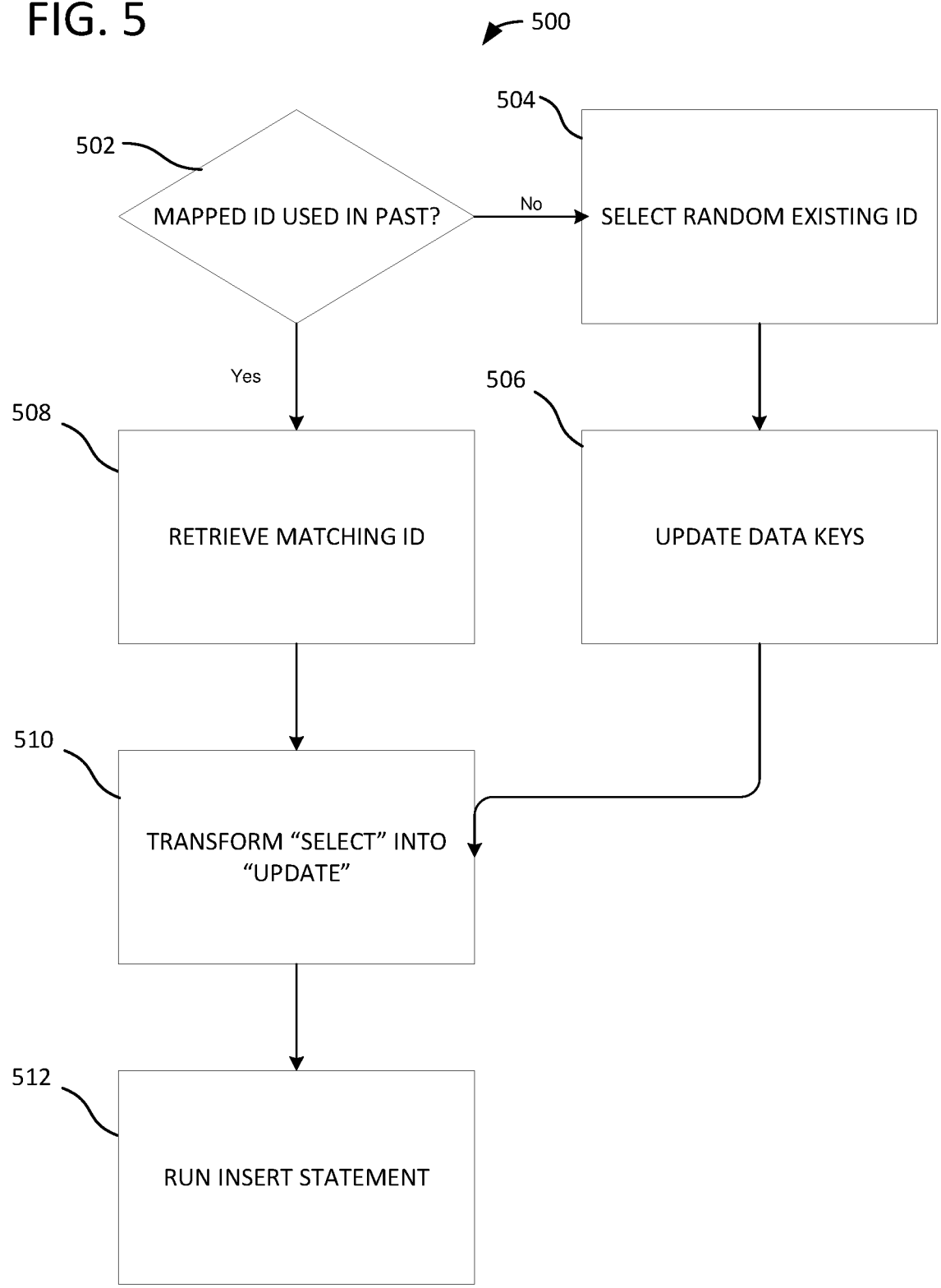
FIG. 5 illustrates an example method of managing data identifiers.

FIG. 5 illustrates an example where an alternative dataset is updated in this way and in which a key manager is added to system 200 of FIG. 2 between API 224 and cache 222. The key manager is in communication with stored data keys (e.g., database keys). The key manager changes the key (also referred to as an ID) associated with the data items so that the real key for compromised data is not stored in the alternative dataset to provide additional security.

In decision block 502, it is determined if a mapped ID was used in the past. If not, then an existing ID is selected (for example, at random). In the example of FIG. 3 in which the refined query is "SELECT name FROM PROFILES WHERE USERID=15," another ID, for example 217, is mapped to the real ID of 15. The data key storage is then updated in process block 506. If a mapped ID was used in the past, it is retrieved in process block 508. In process block 510, a "SELECT" statement is transformed into "INSERT" or "UPDATE." This can be done by executing the refined query, "SELECT name FROM PROFILES WHERE USERID=15," against the real data store (e.g., dataset 216) and obtaining the result "Peter." Then, the corresponding INSERT or UPDATE statement is determined—"UPDATE PROFILES SET name=Peter WHERE Userid=217". The statement is then executed in process block 512 to add "Peter" to the alternative dataset.

Figure 6:
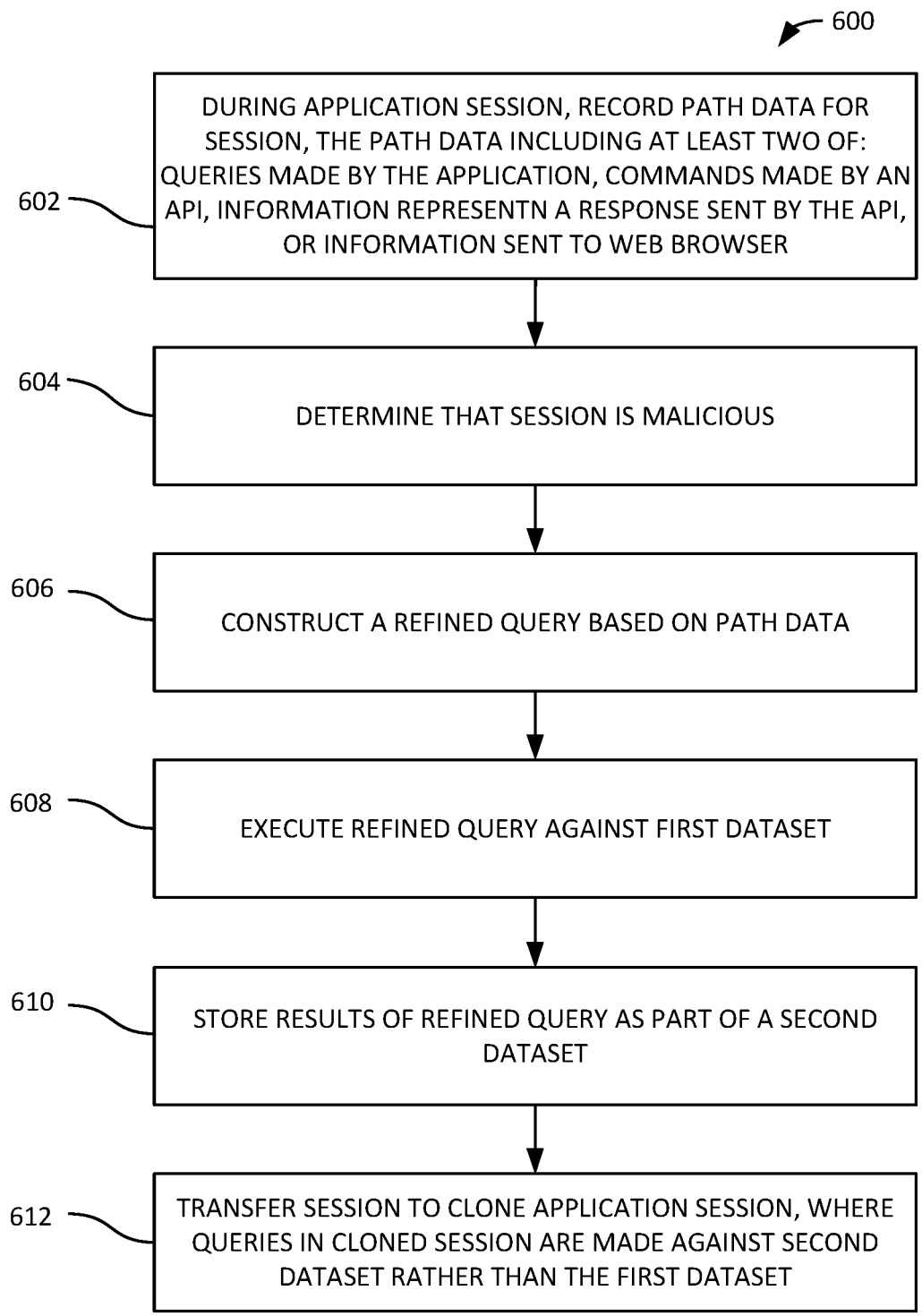
FIG. 6 illustrates an example method of securing an application in which a refined query is constructed that corresponds to compromised data.

FIG. 6 illustrates a method 600 of securing an application in which a refined query is constructed that corresponds to compromised data. In process block 602, during a session with an application, path data for the session is recorded. The path data includes at least two of: one or more queries made by the application, one or more commands made by an API in response to the one or more queries made by the application, information representing a response sent by the API to the application, or information sent to the web browser by the application.

In process block 604, it is determined that the session is a malicious session. In process block 606, a refined query is constructed based on the path data. The refined query corresponds to a compromised portion of a first dataset that was provided to the web browser prior to the determination that the session is a malicious session. In process block 608, the refined query is executed against the first dataset. In process block 610, the results of the refined query are stored as part of a second dataset. In process block 612, the session is transferred to a cloned application session. Queries in the cloned application session are made against the second dataset rather than the first dataset. In some examples, the refined query is constructed and periodically updated to reflect changes in the recorded path data prior to determining that the session is a malicious session in process block 604.

Example Computing Systems

Figure 7:
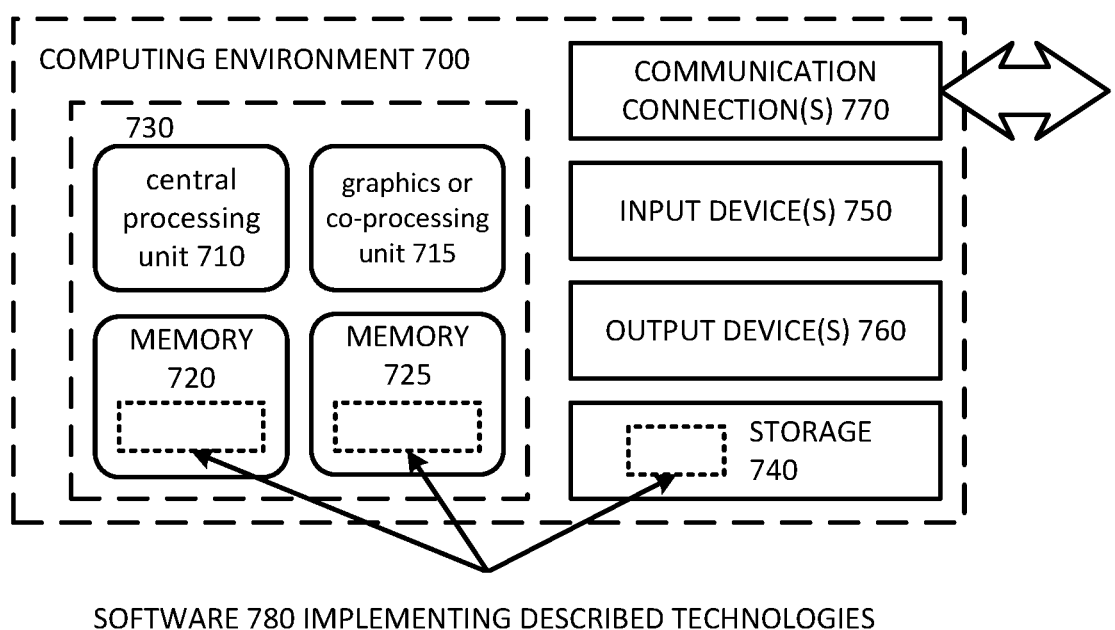
FIG. 7 is a diagram illustrating a generalized implementation environment in which some described examples can be implemented.

FIG. 7 depicts a generalized example of a suitable computing system 700 in which the described innovations may be implemented. The computing system 700 is not intended to suggest any limitation as to scope of use or functionality, as the innovations may be implemented in diverse general-purpose or special-purpose computing systems.

With reference to FIG. 7, the computing system 800 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s). For example, memory 720 and 725 can store recorder 204, constructor 226, and other components of FIG. 2.

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more innovations described herein. For example, storage 740 can store recorder 204, constructor 226, and other components of FIG. 2.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 7, computer-readable storage media include memory 720 and 725, and storage 740. The term computer-readable storage media does not include signals and carrier waves. In addition, the term computer-readable storage media does not include communication connections (e.g., 770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

We claim:

1. A method for securing an application, the method comprising:
    during a session with an application, recording one or more queries made to a first dataset by the application;
    after recording the one or more queries, determining that the session is a malicious session;
    transferring the malicious session to a cloned application session, wherein access to the first dataset is blocked in the cloned application session;
    determining a compromised portion of the first dataset that was returned in response to the one or more queries recorded during the malicious session; and
    generating an alternative dataset accessible to queries made in the cloned application session, wherein the alternative dataset includes the data in the compromised portion of the first dataset as well as new data not associated with the first dataset.

2. The method of claim 1, wherein data in the first dataset that was not queried by the application prior to the transferring to the cloned application session is not included in the alternative dataset.

3. The method of claim 1, wherein generating the alternative dataset further comprises generating the new data and combining the new data with the compromised portion of the first dataset.

4. The method of claim 1, wherein the alternative dataset is at least as large as the first dataset and is used in place of the first dataset in the cloned application session.

5. The method of claim 1, wherein the compromised portion of the first dataset included in the alternative dataset is data determined to have been provided to a client computing device interacting with the application prior to determining the session is a malicious session.

6. The method of claim 5, further comprising prior to determining that the session is a malicious session, recording one or more data types for data sent to the client computing device by the application during the session, wherein the recorded one or more data types are used in determining the data in the first dataset provided to the client computing device.

7. The method of claim 1, wherein the data in the compromised portion of the first dataset is selected based on a refinement of the one or more recorded queries.

8. The method of claim 1, wherein when a new query made during the cloned application session overlaps with the one or more queries recorded prior to determining that the session is malicious, query results for the overlapping portion of the new query are provided from the alternative dataset, and query results for the non-overlapping portion of the new query are provided from the new data that are not included in the first dataset.

9. The method of claim 1, wherein the application is a web application, the first dataset is stored in a database, and the cloned application session is prevented from accessing the database.

10. A system, comprising:
a processor; and
one or more computer-readable storage media storing computer-readable instructions that, when executed by the processor, perform operations comprising:
during a session with an application in which a web browser interacts with the application and the application accesses a dataset, recording path data for the session, the path data representing interactions among the web browser, application, and dataset, wherein the path data includes one or more queries made by the application;
detecting malicious activity in the session;
based on the recorded path data, determining a compromised portion of the dataset that was provided to the web browser prior to detection of the malicious activity;
populating a first part of an alternative dataset with the data in the compromised portion of the dataset;
populating a second part of the alternative dataset with new data not associated with the dataset; and
transferring the session to a cloned application session, where results for queries received in the cloned application session are provided from the alternative dataset.

11. The system of claim 10, wherein the alternative dataset is at least as large as the dataset accessed by the application, wherein the alternative dataset is first populated with new data, and wherein the data in the compromised portion of the dataset is written over some of the new data based on identifiers associated with the data in the compromised portion of the dataset.

12. The system of claim 10, wherein the application accesses the dataset through an application programming interface (API), and wherein the path data further comprises at least one of:
one or more commands made by the API in response to the one or more queries made by the application;
information representing a response sent by the API to the application; or
information sent to the web browser by the application.

13. The system of claim 12, wherein the path data further comprises at least one of HyperText Transfer Protocol (HTTP) requests from the browser, Structured Query Language (SQL) commands generated by the API, or JavaScript Object Notation (JSON) files returned from the API to the application.

14. The system of claim 10, wherein the compromised portion of the dataset is determined by constructing a refined query based on the path data and executing the refined query against the dataset accessed by the application.

15. The system of claim 10, wherein the operations further comprise:
storing data in the compromised portion of the dataset in a second dataset accessible in the cloned application session;
assigning new identifiers to the data stored in the second dataset; and
mapping identifiers of the data stored in the second dataset to identifiers of the data in the compromised portion of the dataset.

16. One or more computer-readable storage media storing computer-executable instructions for securing an application, the securing comprising:
during a session with an application, recording path data for the session, the path data including at least two of: one or more queries made by the application, one or more commands made by an application programming interface (API) in response to the one or more queries made by the application, information representing a response sent by the API to the application, or information sent to a web browser by the application;
determining that the session is a malicious session;
constructing a refined query based on the path data;
executing the refined query against the first dataset, where results of executing the refined query form a compromised portion of the first dataset that was provided to the web browser prior to the determination that the session is a malicious session;
generating an alternative dataset, the alternative dataset including both the compromised portion of the first dataset and new data not associated with the first dataset; and
transferring the session to a cloned application session, wherein queries in the cloned application session are made against the second-alternative dataset rather than the first dataset.

17. The one or more computer-readable storage media of claim 16, wherein prior to determining that the session is a malicious session, the refined query is periodically updated to reflect changes in the recorded path data.

* * * * *